United States Patent
Wians

(10) Patent No.: US 6,592,478 B2
(45) Date of Patent: Jul. 15, 2003

(54) VARIABLE SPEED TRANSMISSION AND METHOD OF USE

(75) Inventor: Jeffrey A. Wians, Mebane, NC (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/739,795

(22) Filed: Dec. 20, 2000

(65) Prior Publication Data

US 2002/0077203 A1 Jun. 20, 2002

(51) Int. Cl.[7] .......................... F16H 55/56; F16H 9/12; F16H 63/00
(52) U.S. Cl. .............................. 474/38; 474/42; 474/8; 474/46; 474/69
(58) Field of Search .............................. 474/18, 28, 69, 474/8, 9, 46, 37, 15, 19, 17, 16, 42, 14, 38

(56) References Cited

U.S. PATENT DOCUMENTS

| | | | | |
|---|---|---|---|---|
| 3,599,504 A | * | 8/1971 | Taylor | 474/15 |
| 3,884,316 A | * | 5/1975 | Bowers | 180/230 |
| 4,026,161 A | * | 5/1977 | Vogel | 474/19 |
| 4,568,315 A | | 2/1986 | Tomiyori et al. | 474/17 |
| 4,857,033 A | | 8/1989 | Czarka | 474/14 |
| 5,230,669 A | * | 7/1993 | Tervola | 475/208 |
| 6,270,436 B1 | * | 8/2001 | Reik et al. | 474/15 |

FOREIGN PATENT DOCUMENTS

| | | | |
|---|---|---|---|
| DE | 1108037 | | 5/1961 |
| EP | 0310402 | | 4/1989 |
| EP | 0383282 A1 | | 8/1990 |
| JP | 60-113720 A | * | 6/1985 |
| JP | 01-145461 A | * | 6/1989 |
| JP | 08-270744 A | * | 10/1996 |
| JP | 09-68273 A | * | 3/1997 |

* cited by examiner

Primary Examiner—Marcus Charles
(74) Attorney, Agent, or Firm—Morgan, Lewis & Bockius LLP

(57) ABSTRACT

A variable speed transmission includes an actuator mechanism that can be remotely activated to cause engagement of a drive unit and to subsequently vary the speed of the drive unit using the same activation mechanism. The variable speed transmission can include a first pulley that has a first and second face that are movable relative to each other by activation of the actuator mechanism. When the first and second faces of the first pulley are located in a first position, a belt located on the first pulley remains motionless. The first and second faces can be moved by the actuator mechanism into a second position where the first and second plates engage the belt with enough frictional force to cause the belt to start moving about the first pulley. The first and second faces of the first pulley can also be moved between the second position and a third position such that the space between the faces becomes smaller. As the space between the faces becomes smaller, the belt moves outward and away from the rotational axis of the pulley, thus moving about the axis faster as the space between the faces gets smaller.

23 Claims, 10 Drawing Sheets

VARIABLE SPEED TRANSMISSION AND METHOD OF USE

BACKGROUND OF THE INVENTION

1. Field of the Invention

The present invention relates to power equipment, including but not limited to mowers, tillers, snow blowers, and tractors, and more particularly, to a variable speed transmission and method for using the variable speed transmission.

2. Discussion of Related Art

Conventional power equipment such as lawn mowers, snow blowers, mulchers, etc. often include "self-propulsion" mechanisms for automatically driving the wheel, track or other drive mechanism used to propel the power equipment. Typically, the self-propulsion drive mechanism is activated by engaging a transmission that connects/disconnects the transmission shaft to the drive wheel. The speed of the drive wheel varies proportionally with the speed of the engine. Accordingly, the speed of the drive wheel can only be varied by changing the throttle position or by changing the gear ratios inside the transmission to increase/decrease the speed of the engine.

Recently it has become desirable to provide all types of power equipment with variable speed transmissions in order to smoothly vary the drive speed of the power equipment without increasing/decreasing engine speed to vary the drive speed. One attempt at providing such a device is currently incorporated in power equipment produced and sold in Europe by France Reductor, Inc. Idler pulley systems have also been used in an attempt to provide variable speed power equipment.

The France Reductor VST includes a first belt that is attached between a drive pulley on the engine output shaft and a driven pulley on a rotational shaft. A second pulley is attached to the same rotational shaft as the driven pulley and is locked and rotates synchronously with the driven pulley. A second belt is attached between the second pulley and a second driven pulley connected to a transmission shaft. The transmission shaft is connected to a transmission that transmits rotational power to a drive wheel or other drive mechanism. A clutch located in this transmission can be actuated to engage/disengage the transmission and transmit/disengage rotational power to the drive mechanism.

In order to vary the speed of the drive mechanism, a plate supporting the rotational shaft can be moved against the bias of a spring to tension and loosen the first belt and second belt, respectively. The first driven pulley and the second drive pulley (both of which are located on the same rotational shaft) have variable width grooves that are caused to vary when their respective belts are tensioned and loosened. Accordingly, when the first belt is tensioned, the first belt moves deeper into the groove of the first pulley towards the rotational axis of the rotational shaft, thus rotating the rotational shaft at ever increasing speeds as tension in the belt increases. Likewise, when the second belt is simultaneously loosened, the groove in the second drive pulley becomes narrower and the second belt moves out of the groove and away from the rotational axis of the rotational shaft, thus increasing the speed of the second belt and ultimately increasing the speed of the drive mechanism. Two belts are required in such a system to provide the necessary increase in variable speed output for the power equipment drive mechanism. In addition, two control mechanisms are necessary such that one control mechanism can actuate the transmission and one control mechanism can vary the speed of the transmission.

Because the France Reductor VST system requires two belts, four pulleys, two control mechanisms and a separate clutched transmission, the cost of the system and the space requirements are both relatively high. It is usually necessary to mount this VST system on top of a housing structure in order to fit such a large system on power equipment. In addition, the many different parts make the system susceptible to mechanical failures and creates problems with the range of aesthetic design available to power equipment that incorporates such a system. Furthermore, the actuation of the system is a two step process, and speed variation can be sudden at times if the transmission and the variable speed actuation mechanisms are not actuated in the correct order. The belts are also constantly moving in this related art VST system.

Another type of VST system that is commonly used in power equipment includes a hydrostatic transmission for varying the speed output to a drive unit. In such a system, a single control mechanism can be used to vary the speed of a drive unit from a neutral position to maximum speed. However, such transmissions are relatively expensive to manufacture. In addition, maintenance and repair of such a system are significantly more difficult and expensive than maintenance and repair of belt drive and/or geared transmission systems.

SUMMARY OF THE INVENTION

Accordingly, the present invention is directed to a variable speed transmission that substantially obviates one or more of the problems due to limitations and disadvantages of the related art.

An object of the present invention is to provide an efficient, inexpensive and compact variable speed transmission that can be actuated from a neutral position through a full speed position by a single actuator mechanism.

Another object of the invention is to incorporate the belt into the clutch mechanism of the variable speed transmission.

A further object of the invention is to provide a compact single actuation variable speed transmission that is capable of producing a relatively high level of output speed;

Another object of the present invention is to provide a compact assembly that can be easily and adequately shielded and requires as few parts as possible.

A still further object of the present invention is to minimize the number of pulleys and belts necessary, and to provide a variable speed transmission that uses a single belt connected between two pulleys such that the amount of moving parts is reduced and the possibility of malfunctions are reduced.

An additional object of the invention is to provide a control mechanism that varies drive speed between a neutral, intermediate and full speed position while also being variably operable between these three separate positions.

Another object of the invention is to vary the speed of a drive mechanism for power equipment in a smooth and reliable manner.

A still further object of the invention is to provide a compact single actuator mechanism that controls the output speed to a drive mechanism from zero to a maximum speed by moving the actuator mechanism in a single uniform motion.

Another object of the invention is to incorporate the variable speed transmission into the drive shaft of a motor such that a compact arrangement of the transmission can be achieved.

Additional features and advantages of the invention will be set forth in the description which follows, and in part will be apparent from the description and claims hereof as well as the appended drawings.

To achieve these and other advantages and in accordance with the purpose of the present invention, as embodied and broadly described, a variable speed transmission includes: a first pulley having a rotational axis and including a first face and a second face, the first face being movable with respect to the second face; a belt located adjacent the first face and the second face of the first pulley; and an actuator located adjacent the first pulley and adapted to move the first face to move with respect to the second face between a neutral position, an intermediate position and a full speed position, the neutral position defined by the first face being located at a first position with respect to the second face, and the first face being rotatable relative to the second face, the intermediate position defined by the first face being located at a second position that is closer to the second face than when the first face is located at the first position, the belt being in frictional engagement with the first face and second face such that motion of one of the first face, second face and belt causes another one of the first face, second face and belt to move, and the full speed position defined by the first face being located at a third position that is closer to the second face than when the first face is located at the second position, the belt being located in a position further from the rotational axis of the first pulley than when the first face is located at the second position.

The invention also includes a variable speed transmission for continuously varying the output speed of a drive wheel from zero to an upper speed limit, which includes: a single control mechanism capable of controlling the speed of the drive wheel from zero to the upper speed limit; an actuator connected to the control mechanism; and a drive train operationally connected between the control mechanism and the drive wheel, wherein the drive train includes a first and second pulley and no more than one belt.

In addition, the invention includes a variable speed transmission for continuously varying the output speed of a drive wheel from zero to an upper speed limit, which includes: a single control mechanism capable of controlling the speed of the drive wheel from the upper speed limit to zero; an actuator connected to the control mechanism; and a drive train operationally connected between the control mechanism and the drive wheel, wherein the drive train includes a first and second pulley connected by a belt, the first pulley having a rotational axis, a first face and a second face, the first face being movable with respect to the second face; wherein the actuator is located adjacent the first pulley and capable of causing the first face to move with respect to the second face between a neutral position, an intermediate position and a full speed position, the neutral position defined by the first face being located at a first position with respect to the second face, and rotatable with respect to the first face, the intermediate position defined by the first face being located at a second position that is closer to the second face than when the first face is located at the first position, the belt being in frictional engagement with the first face and second face such that motion of one of the first face, second face and belt causes another one of the first face, second face and belt to move, and the full speed position defined by the first face being located at a third position that is closer to the second face than when the first face is located at the second position, the belt being located in a position further from the rotational axis of the first pulley than when the first face and second face are in the intermediate position.

Furthermore, the invention can include a variable speed transmission, that includes: a first pulley having a rotational axis and including a first face and a second face, the first face being movable with respect to the second face; a second pulley having a second pulley rotational axis and including a primary face and a secondary face; a belt located on the first pulley and second pulley; and an actuator located adjacent the first pulley and adapted to move the first face with respect to the second face between a neutral position and a drive position, the neutral position is defined by the first face being located at a first position with respect to the second face, and the first face being rotatable with respect to the second face, the drive position is defined by the first face and second face being frictionally engaged with the belt such that the first face, second face and belt rotate together.

The invention can also include a variable speed transmission, including: a first pulley having a rotational axis and including a first face and a second face, the first face being movable with respect to the second face; a second pulley having a second pulley rotational axis and including a primary face and a secondary face, the primary face being movable with respect to the secondary face along the second pulley rotational axis; a biasing mechanism located adjacent one of the primary face and secondary face of the second pulley and adapted to bias the primary face towards the secondary face; a belt located on the first pulley and second pulley; and an actuator located adjacent the first pulley and adapted to move the first face with respect to the second face between a neutral position and a drive position, the neutral position is defined by the first face being located at a first position with respect to the second face, and the first face being rotatable with respect to the second face, the drive position is defined by the first face and second face being frictionally engaged with the belt such that the first face, second face and belt rotate together.

Additionally, the invention can include a method for using a variable speed transmission that includes a first pulley having a rotational axis, a first face and a second face, the first face being movable along the rotational axis with respect to the second face, a belt located adjacent the first face and the second face of the first pulley, the method including driving one of the first face, the second face and the belt about the rotational axis of the first pulley; moving the first face along the rotational axis and relative to the second face such that a portion of each of the first face and the second face frictionally engages the belt to cause one of the first face, the second face and the belt to begin movement about the rotational axis of the first pulley; and moving the belt away from the rotational axis of the first pulley to cause the belt to move faster about the rotational axis of the first pulley.

The invention can also include a method for using a variable speed transmission that includes a first pulley having a rotational axis, a first face and a second face, the first face being movable along the rotational axis with respect to the second face, a second pulley having a second pulley rotational axis, a primary face and a secondary face, the primary face being movable with respect to the secondary face along the second pulley rotational axis, a belt connected between the first pulley and the second pulley, including: driving one of the first face, the second face and the belt about the rotational axis of the first pulley; moving the first face along the rotational axis and relative to the second face such that a portion of each of the first face and the second face frictionally releases from the belt to cause one of the first face, the second face and the belt to begin movement relative to another one of the first face, the second face and the belt.

The invention can also include a method for using a variable speed transmission to drive a propulsion mechanism on a piece of power equipment, including: providing a control mechanism that is connected to a drive train which drives the propulsion mechanism, the drive train including a first pulley having a rotational axis, a first sheave and a second sheave, and a belt having an inner surface located around the first pulley; permitting the first sheave to remain substantially stationary relative to the second sheave; rotating the first sheave of the first pulley with respect to the belt; and engaging the belt with the first sheave of the first pulley with enough force to begin movement of the belt about the first pulley.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
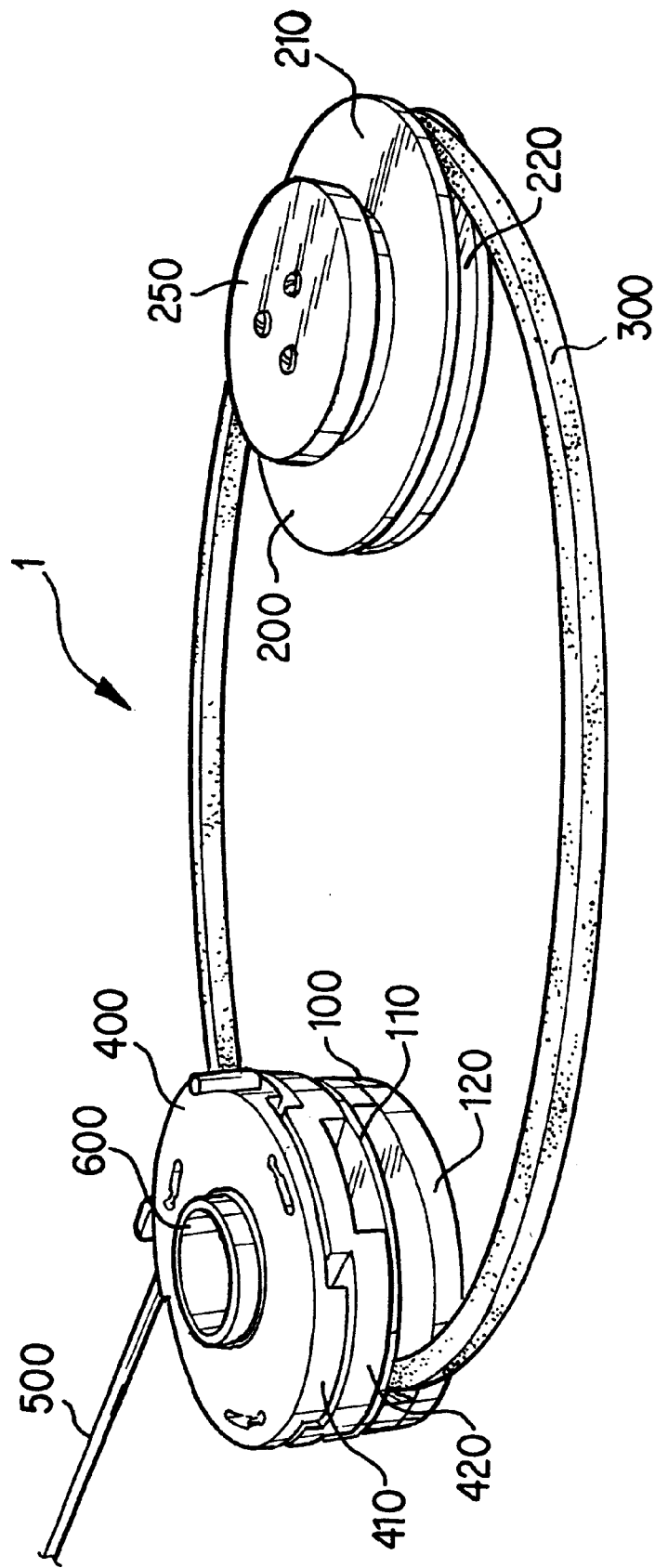
FIG. 1 is an isometric view of a variable speed transmission made in accordance with the principles of the invention.
Figure 2:
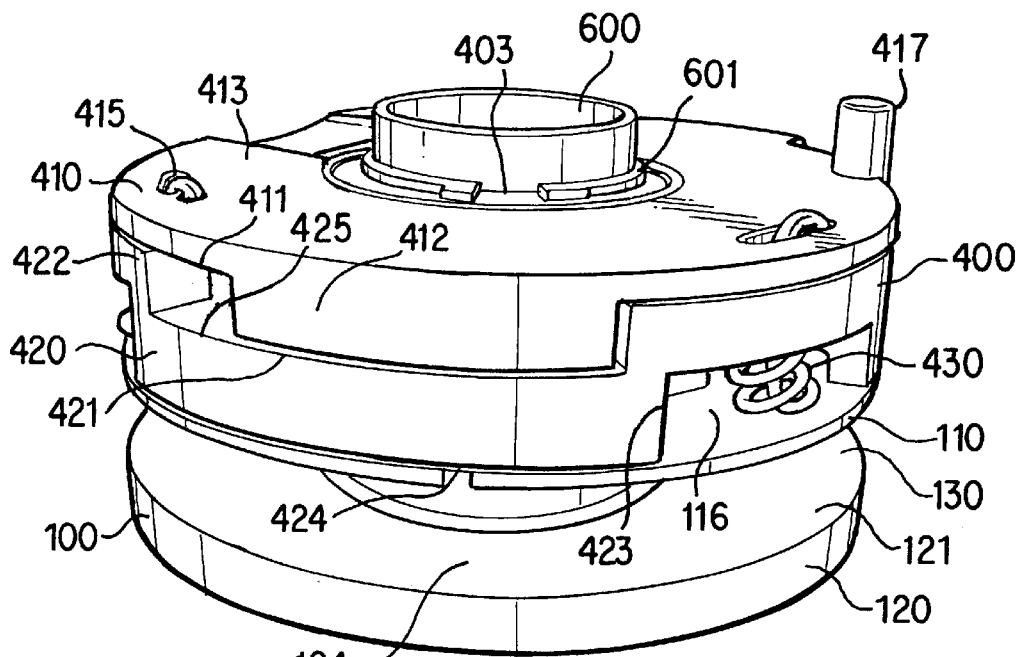
FIG. 2 is an isometric view of the actuator and first pulley arrangement of FIG. 1.
Figure 3:
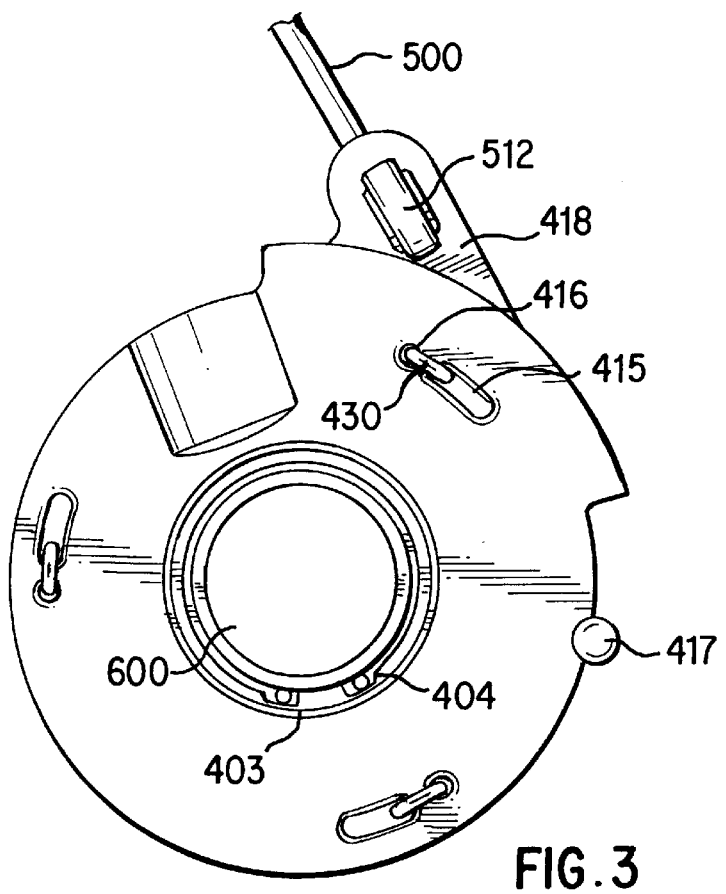
FIG. 3 is a top view of the actuator and first pulley arrangement of FIG. 1.
Figure 4:
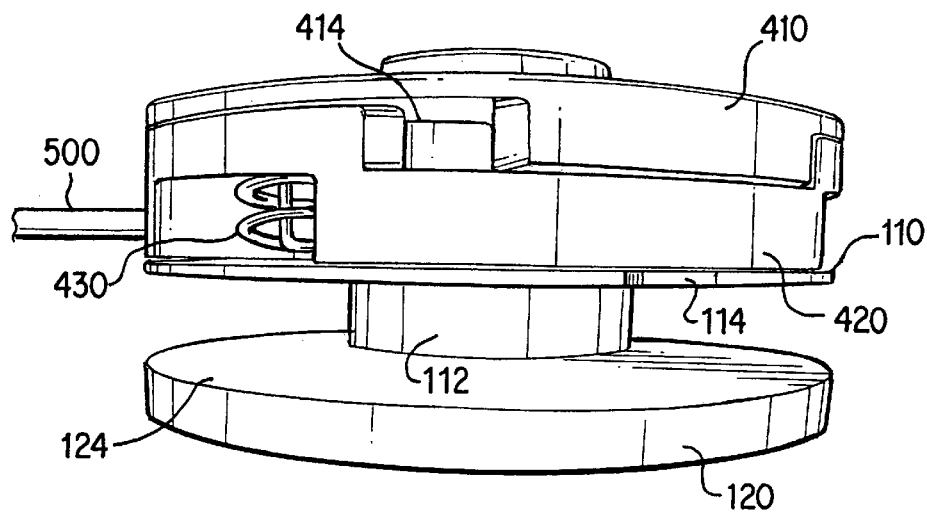
FIG. 4 is a side view of the actuator and first pulley arrangement of FIG. 1.
Figure 5:
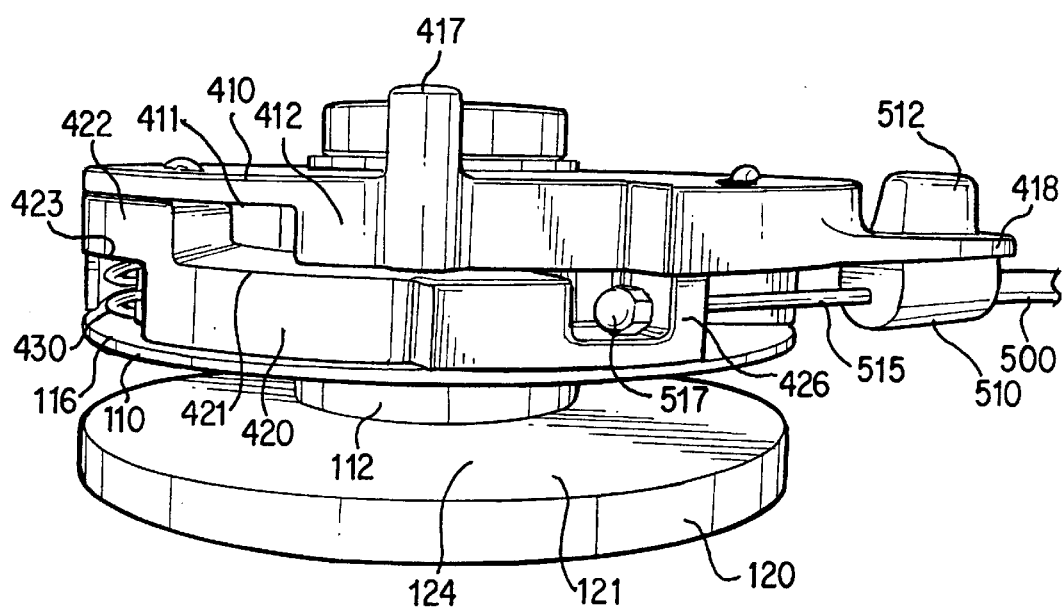
FIG. 5 is an operational side view of the actuator and first pulley arrangement of FIG. 1 in a neutral position.
Figure 6:
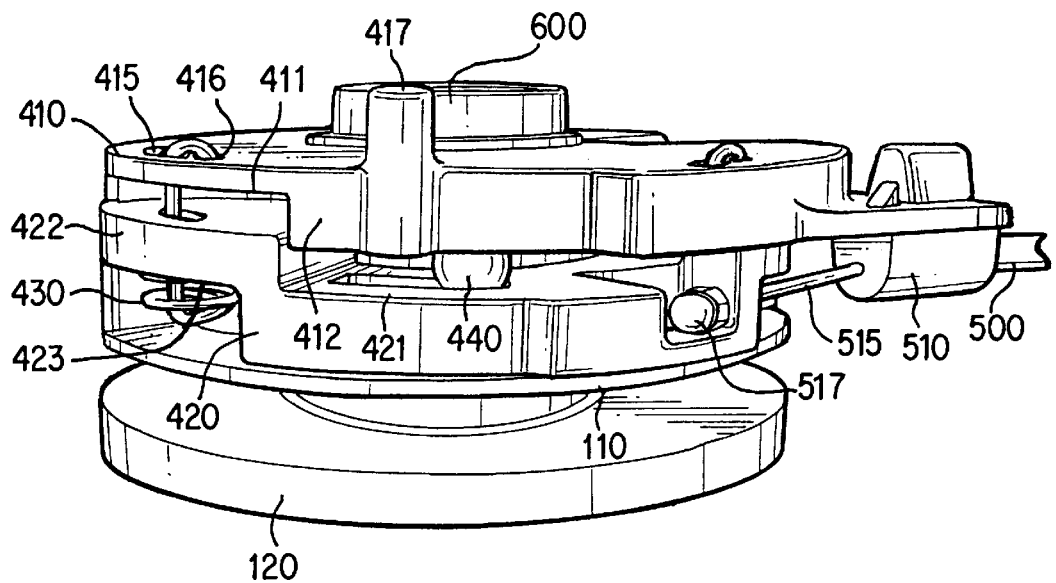
FIG. 6 is an operational side view of the actuator and first pulley arrangement of FIG. 1 in a full speed position.
Figure 7:
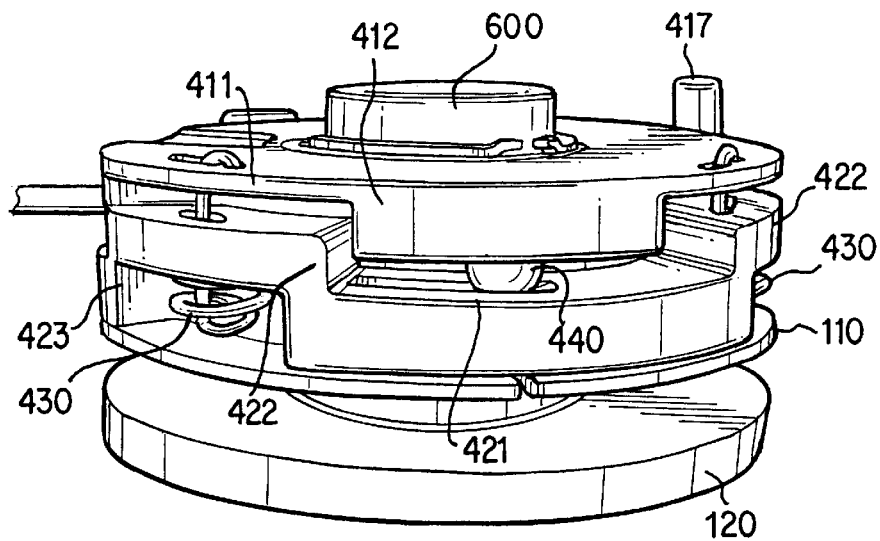
FIG. 7 is an operational second side view of the actuator and first pulley arrangement of FIG. 1 in an intermediate position.

FIG. 1 illustrates an isometric top view of a preferred embodiment of the variable speed transmission (VST). The VST includes a first pulley 100 and actuator 400 connected to an engine output drive shaft 600. A belt 300 connects the first pulley 100 to a second pulley 200, which in turn is connected to a drive mechanism for the associated piece of power equipment. Thus, the rotational energy from the engine output drive shaft 600 can be transmitted to the drive mechanism via a first pulley 100, actuator 400, belt 300 and a second pulley 200.

A control mechanism 500 can be attached to the actuator 400 to vary the output speed of the drive mechanism from about zero to an engagement/intermediate position speed and then proceed to a maximum or full speed. The control mechanism 500 varies the range of output speed of the drive mechanism by causing the actuator 400 to change the respective groove width of the first and second pulleys 100, 200, thus changing the radius of rotation of the belt 300 about the first and second pulleys 100 and 200, as explained in greater detail below. In addition, the present invention provides a neutral position in which the rotational energy of the drive shaft 600 is disengaged from the drive mechanism of the power equipment. This neutral position is realized by using the belt 300 as a "clutch," which will also be explained in greater detail below.

An actuator (not shown) connected to the control mechanism 500 permits an operator of the power equipment to control actuation of the actuator 400, and to ultimately control the actuation and variance of the speed output by the drive mechanism of the power equipment. The actuator is preferably controlled using a single motion to move the actuator between a neutral position and a full speed position. One type of actuator that can be used is a U-shaped bar type actuator pivoted to a U-shaped handle of the power equipment. This type of actuator is controlled by squeezing the U-shaped bar and pivoting it with respect to the U-shaped handle to cause a control line 515 to move relative to the handle. When the U-shaped actuator bar becomes flush with and/or coplanar with the U-shaped handle, the control mechanism 500 causes the actuator 400 to be at its maximum speed position. When the U-shaped actuator bar is pivoted to its furthest angled position with respect to the U-shaped handle, the actuator is in its neutral position. Thus, the operator can propel the power equipment from zero to maximum speed by squeezing and/or otherwise moving the U-shaped actuator bar to pivot it with respect to the U-shaped handle. Of course, other actuators such as a rotary knob or pivoting lever could be used in place of the U-shaped bar actuator to control the speed of the power equipment between zero and maximum speed.

As shown in FIGS. 2–7, the actuator 400 can include a first actuator plate 410 and a second actuator plate 420, each of which can rotate with respect to the other upon activation of the control mechanism 500. The first actuator plate 410 can include an extension lock member 417 on its top surface 413 for locking the first actuator plate to the housing or other element of the power equipment. Thus, the second actuator plate 420 will be able to rotate with respect to both the first actuator plate 410 and the power equipment device in general. Alternatively, the first actuator plate 410 could be rotatable with respect to both the second actuator plate 420 and the power equipment device in general. Bearings 404 permit both the first and second actuator plate to rotate relative to the drive shaft 600 located in shaftway 403 of the actuator plates 410 and 420. The bearings 404 can be the same or different style bearings and can be selected to conform to the necessary performance characteristics desired for a particular application of the invention. In addition, when economical considerations mandate, it is possible in some circumstances to not use bearings or consolidate various bearings. A retaining clip 601 can be provided to keep the actuator 400 in position on the drive shaft 600.

The control mechanism 500 is preferably connected to the actuator 400 by an attachment ball 517 that is locked into a mating actuator cutout 426 in the second actuator plate 420. A cable retainer 510 can be fixed to an actuator extension 418 on the first actuator plate 410 by inserting a lock nub 512 that extends from the cable retainer 510 into an aperture in the extension 418 of the first actuator plate 410. A control cable (or control line) 515 located within the cable retainer 510 can move relative to the cable retainer 510 and the first actuator plate 410. Accordingly, movement of the control line 515 causes the second actuator plate 420 to move/rotate with respect to the first actuator plate 410. A ball/ramp mechanism 443 (see FIG. 3) can be used in combination with an actuator spring 430 to bias the second actuator plate 420 to its initial position with respect to the first actuator plate 410 when tension in the control line 515 is released.

The ball/ramp mechanism 443 includes balls 440 located between the actuator plates 410 and 420 which ride up respective ramps 441 located in one of the first and second actuator plates 410 and 420. As the second plate 420 rotates with respect to the first actuator plate 410, the balls 403 ride up the ramps 441 and cause the second actuator plate 420 to separate and move away from the first actuator plate 410 against the bias of springs 430. Springs 430 are attached to the first actuator plate 410 and extend through slots 427 located in a springway portion 423 of the second actuator plate 420. The slots 427 are shaped to allow the springs 430 to ride along the lower surface 424 of the second actuator plate 420 as the second actuator plate 420 rotates relative to the first actuator plate 410. The springs 430 bias the second actuator plate 420 towards the first actuator plate 410 throughout rotation of the plates. The springs 430 are connected to the first actuator plate 410 by inserting a portion of each spring 430 into a spring lockhole 416 in the top surface of the first actuator plate 410. The spring 430 extends downward through a spring slot 415 in the first actuator plate 410.

The rotation of the first actuator plate 410 with respect to the second actuator plate 420 can be limited by providing abutments 412 and 422 in the respective first and second actuator plates 410 and 420, respectively. The abutments 412 and 422 ride in slideways 421 and 411, respectively, of the opposing first and second actuator plates 420 and 410. Thus, the rotation of the first and second actuator plates 420 and 410 is limited by the length of the slideways 411 and 421 and the length of their corresponding abutments 422 and 412.

The first pulley 100 includes a first sheave 110 and a second sheave 120 which form a groove 130 therebetween. The second sheave 120 can be connected to rotate with the drive shaft 600 such that both the second sheave 120 and drive shaft 600 rotate with respect to the first sheave 110 of the first pulley 100. The first sheave 110 can also rotate with respect to the drive shaft 600 and with respect to the second actuator plate 420. Bearings 404 can be provided between both the first sheave 110 and drive shaft 600 and between the first sheave 110 and second actuator plate 420 to facilitate their relative rotation. As the second actuator plate 420 moves downward by action of the control mechanism 500, it forces the first sheave 110 of the first pulley towards the second sheave 120 of the first pulley, which decreases the width of the groove 130 of the first pulley 100. As the groove width narrows, the belt 300 is engaged with a face 121 of the second sheave 120 of the first pulley 100. The belt 300 becomes tensioned as it engages the face 121 and begins to rotate about the rotational axis of the first pulley 100 due to frictional force between the rotating face 121 and belt surface. This action is what is referred to above as using the belt 300 as a clutch mechanism.

The groove 130 can be further narrowed by moving the control mechanism 500 to force further separation of the actuator plates 410 and 420, which forces the first sheave 110 closer to the second sheave 120 of the first pulley. The faces 111 and 121 of the first and second sheave 110 and 120 include angled surfaces 114 and 214. As the first and second sheave 110 and 120 move towards each other, the belt is forced to rise radially along these angled surfaces 114 and 124 out of the groove 130. Thus, as the pulley first sheave 110 and pulley second sheave 120 move towards each other, the belt 300 moves away from the rotational axis of the drive shaft 600 and the rotational speed of the belt increases. The drive mechanism is at maximum speed when the belt 300 is at a furthest position from the rotation axis and the first sheave 110 is closest to the second sheave 120 of the first pulley.

The first pulley sheave 110 can also include an extension surface 112 that extends along the rotational axis of the drive shaft 600 and between the first angled surface 114 and second angled surface 124 of the first and second sheaves 110, 120. When the invention is in its neutral position (e.g., when no actuation force is applied to the control mechanism 500, the first and second actuator plates 410 and 420 are together, and the first and second sheave of the first pulley 110 and 120 are at their widest position), the belt 300 tension causes the groove in the first pulley to return to its widest position, and the belt 300 rests on the extension surface 112. The drive mechanism remains effectively at a geared idle or geared neutral state.

The belt 300 is preferably connected between and supplies power from the drive shaft 600 to the second pulley 200. The second pulley 200 can be connected to a drive mechanism of the power equipment for propelling the equipment.

Figure 8:
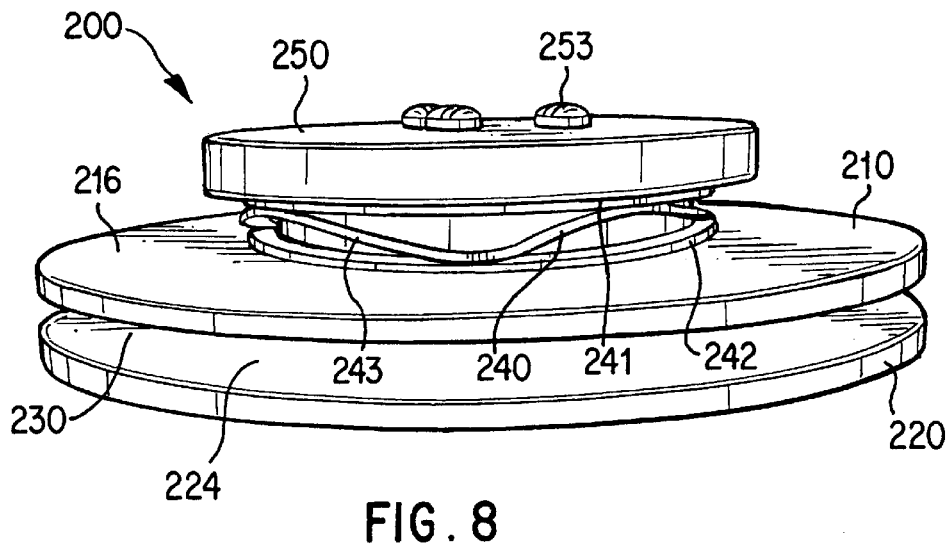
FIG. 8 is an isometric view of the second pulley of FIG. 1.
Figure 9:
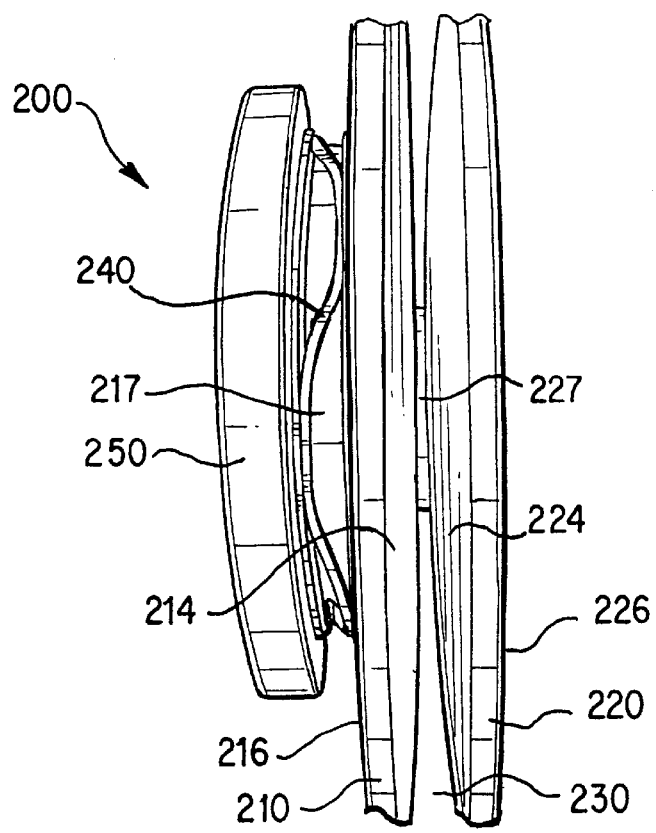
FIG. 9 is a side view of the second pulley of FIG. 1.
Figure 10:
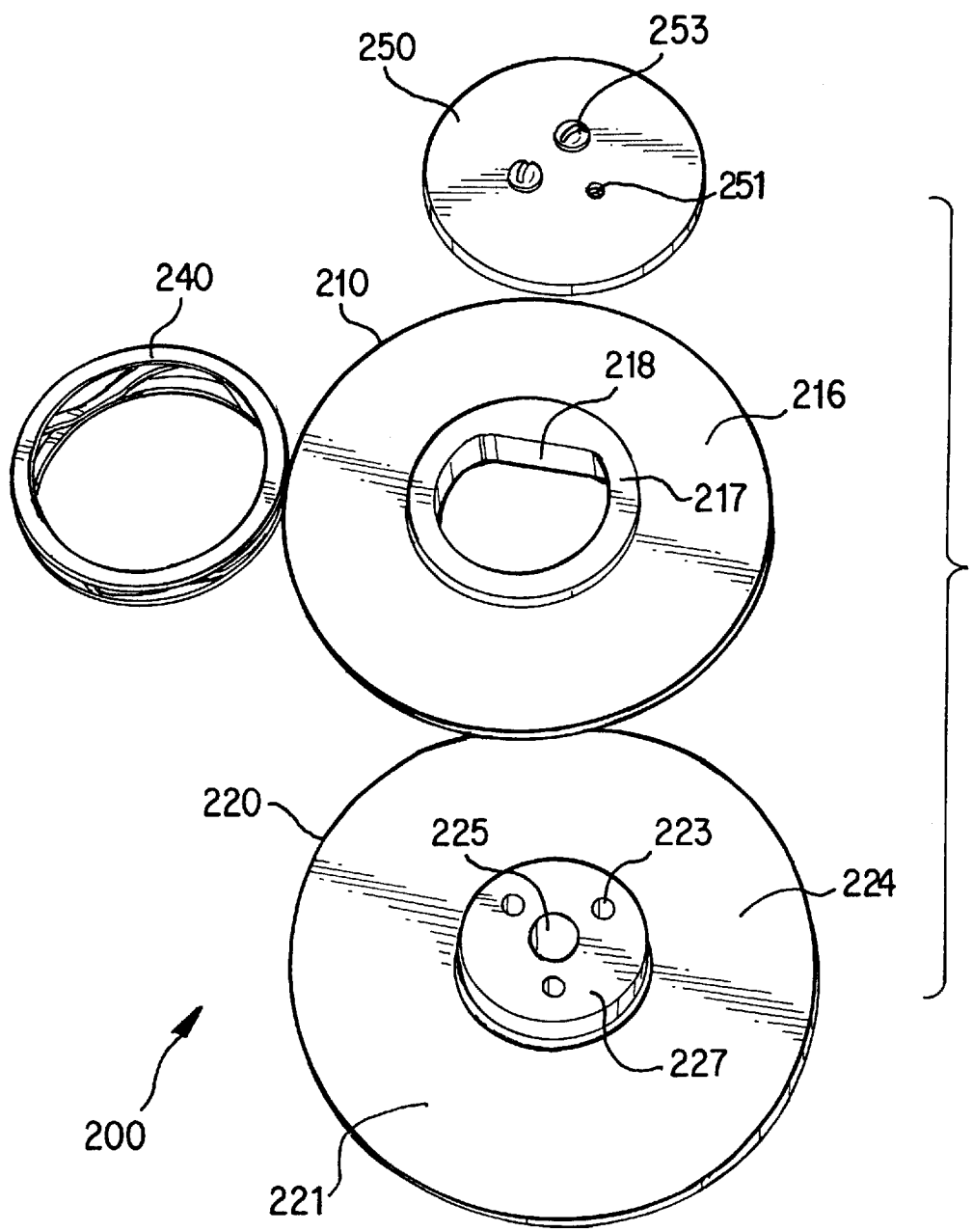
FIG. 10 is a disassembled view of the second pulley of FIG. 1.

As shown in FIGS. 8–10, the second pulley 200 can include a second pulley first sheave 210 that can be connected to and rotate with a second pulley second sheave 220. A hub 227 can be formed in the second pulley second sheave 220 and shaped to extend through a keyway 218 in a collar 217 of the second pulley first sheave 210. The relative shape of the hub 227 and keyway 218 rotationally lock the sheaves 210 and 220 together. The hub 227 includes a shaftway 225 for connection to a driven shaft of the drive mechanism. When the second pulley first sheave 210 is connected to the second pulley second sheave 220, an attachment disk 250 can be attached to the hub 227 of the second pulley second sheave 220 to keep the first and second sheaves 210 and 220 together. The attachment disk 250 can be attached to the hub 227 by a number of screws 253 that extend though holes 251 in the disk 250 and attach to screw holes 223 in the hub 227 of the second sheave 220. Various shaped hubs can be used in the invention, including a single key hub.

A spring 240, which can be a diaphragm type or belleville spring, can be located between the attachment disk 250 and a top surface 216 of the first sheave 210 to bias the first sheave 210 towards the second sheave 220 of the second pulley. The spring 240 rides along the outside of collar 217 in the second pulley first sheave 210 and can include an upper ring 241 and lower ring 242 separated from each other by an intermediate leaflet 243. The upper and lower rings 241 and 242 lie flat on the lower surface of the attachment disk 250 and the top surface 216 of the first sheave 210, respectively. The spring 240 permits the groove 230 formed between the first sheave 210 and second sheave 220 of the second pulley 200 to vary in width in accordance with the tension in the belt 300.

The belt 300 can ride between a first face 211 of the first sheave 210 and a second face 221 of the second sheave 220 of the second pulley 200. Angled surfaces 214 and 224 located on the first and second face 211 and 221, respectively, tend to move the belt away from the rotational axis of the second pulley as the first sheave 210 and second sheave 220 of the second pulley 200 move towards each other under the bias of spring 240. Thus, when tension decreases in the belt 300, the bias of the spring 240 moves the first and second sheaves 210 and 220 together to decrease the width of groove 230. The belt 300 is then caused to move further from the rotational axis of the second pulley, thus slowing the rotational speed of both the second pulley 200 and the drive mechanism to which the second pulley 200 is connected. By contrast, when the belt 300 is tensioned (e.g., when the control mechanism 500 is activated to cause the actuator 400 to move the first pulley sheaves 110 and 120 towards each other to "clutch" the belt 300 into motion/tension), the tension in the belt 300 overcomes the bias in the spring 240 to separate the first and second sheaves 210 and 220 of the second pulley, thus widening the groove 230. As the groove 230 widens, the belt 300 rides inward along the first and second face 211 and 221 of the second pulley 200 towards the rotational axis of the second pulley. As the belt 300 approaches the rotational axis of the second pulley 200, the radius of rotation about the pulley decreases and the speed of rotation is therefore increased accordingly. Thus, the drive mechanism is driven at increasing speeds as the belt 300 is tensioned by the control mechanism 500. Because the groove width of both the first and second pulleys 100 and 200 changes in opposite directions during tensioning (or loosening), a two-fold increase (or decrease) in speed can be achieved at the output shaft of the second pulley 200.

Figure 11:
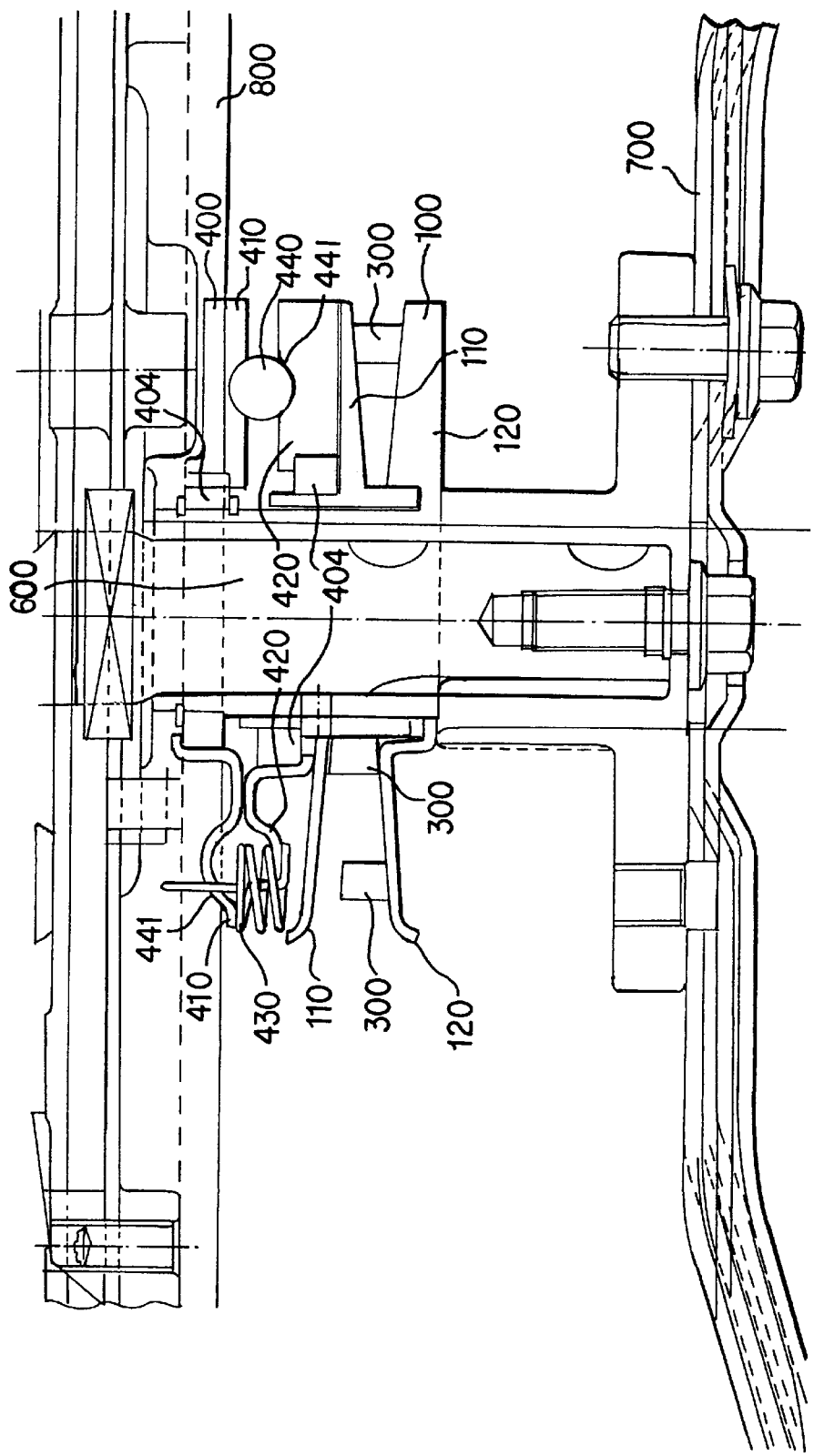
FIG. 11 is a cross-sectional split view of another embodiment of the actuator and first pulley assembly.
Figure 12:
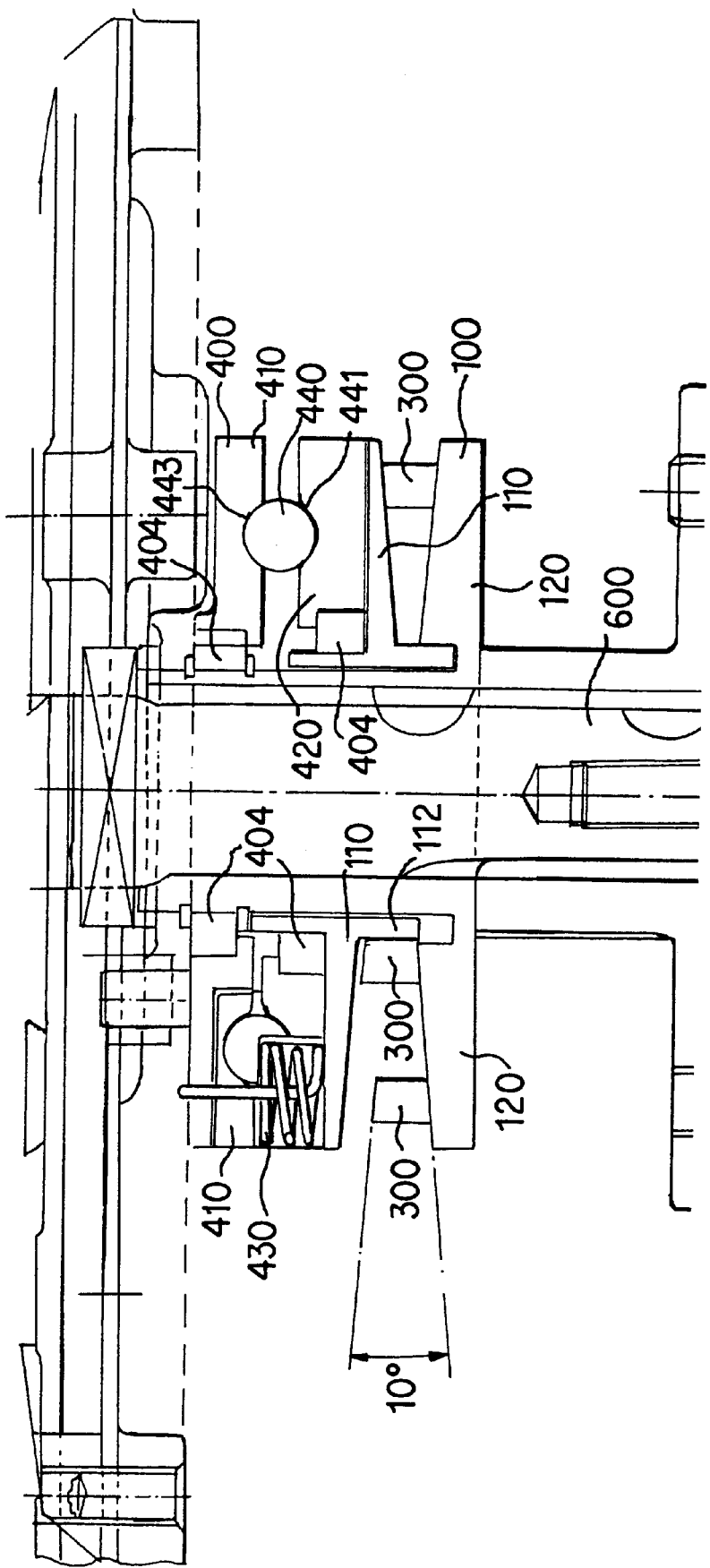
FIG. 12 is a cross-sectional split view of another embodiment of the actuator and first pulley assembly.

As shown in FIGS. 11 and 12, the first pulley 100 actuator 400 can be configured to attach between a mower blade 700 and the lower housing 800 of a mower. The right half of the split view of FIGS. 11 and 12 depicts an embodiment in which many of the pulley 100 and actuator 400 components are molded components and the first pulley is in the maximum speed position (e.g., the actuator 400 is actuated and the first sheave 110 and second sheave 120 of the first pulley 100 are at their minimum separation distance and the belt 300 is furthest from the rotational axis of the drive shaft 600). The left half of the split view of FIG. 11 depicts an embodiment in which many components of the pulley 100 and actuator 400 are plate components and the first pulley 100 and actuator 400 are in a neutral position. However, belt 300 is shown at both a neutral and high speed position in this portion of the split figure.

Figure 13:
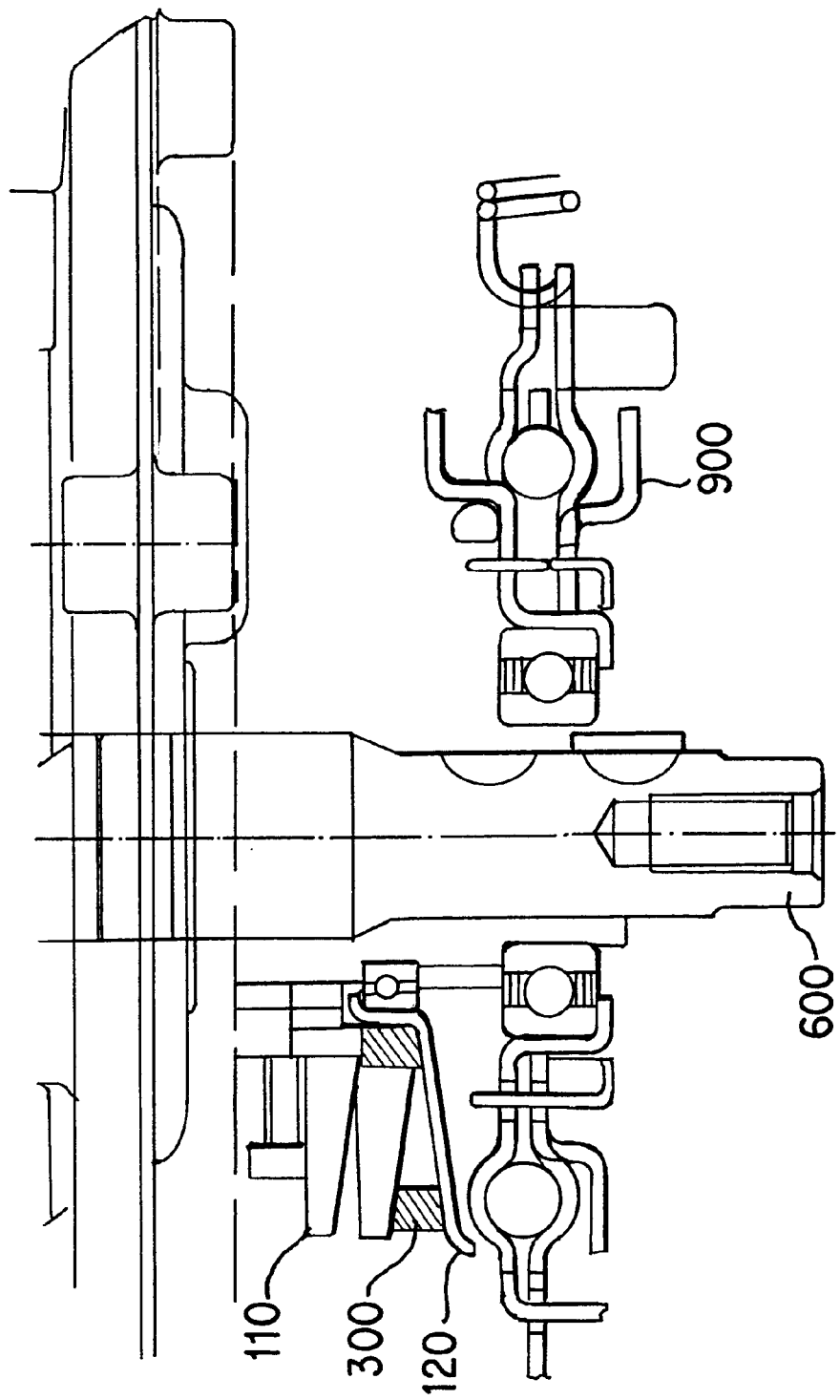
FIG. 13 is a cross-sectional split view of another embodiment of the actuator and first pulley assembly.
Figure 14:
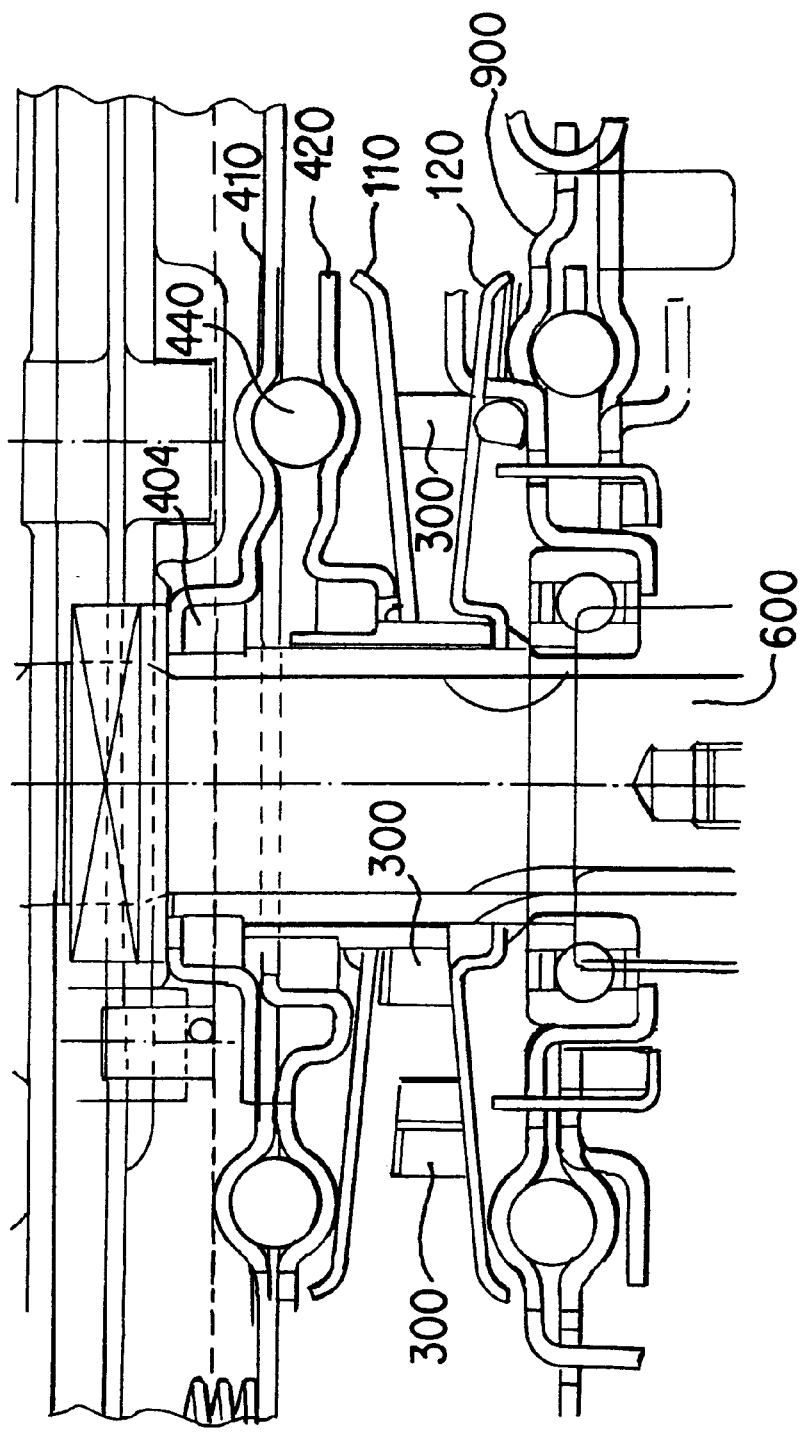
FIG. 14 is a cross-sectional split view of another embodiment of the actuator and first pulley assembly.

FIGS. 13 and 14 show other embodiments of the present invention in which a "blade brake clutch" 900 is incorporated onto the same drive shaft 600 as are the first pulley 100 and actuator 400. In this embodiment, many of the components are shown as being made from metal plate material. However, each of these parts could also be manufactured as molded components. The right half of the split view of FIGS. 13 and 14 depict the blade brake clutch mechanism in its actuated position in which a separate blade clutch disengages the drive shaft from an output member and a blade brake is applied to the disengaged output member to stop rotation of the output member and any equipment, such as mower blades, attached to the output member. The left half of the split views in FIGS. 13 and 14 depict the blade brake clutch in a non-actuated position in which the drive shaft 600 is connected and rotates an output member.

When the belt 300 rides in the first pulley 100, a preferable range for the outer diameter of the first pulley 100 as measured from the outside of the belt varies from 48.2 mm at low speed/neutral, to 68.2 at mid speed, to 88.2 mm at maximum speed. Similarly, when the belt 300 rides in the second pulley 200, a preferable range for the outer diameter of the second pulley 200 as measured from the outside of the belt varies from 103 mm at low speed/neutral, to 83.5 mm at mid-speed, to 64 mm at maximum speed. Of course, the specific value for the diameter of the first and second pulley can change depending on the particular application or desired speed ratio. The horsepower required for driving a mower engine at 3100 rpm which includes a first and second pulley with the above noted diameter variances between neutral and maximum speed is approximately 0.16 hp when cruising, and 0.47 hp at maximum load. In addition, the ground speed can vary from 1.22 mph to 3.61 mph in the preferred embodiment of the invention.

In the above embodiments of the invention, the force required to actuate the actuator 400 can be relatively low such that a low tension force is required in the cable 515. This low tension force provides good operating stability and durability for the variable speed transmission and also permits easy operation by users of the device.

Although the invention has been described with respect to preferred embodiments of the invention, it should be understood that many variations of these embodiments fall within the scope and spirit of the claimed invention. For example, the specific speed, horsepower and diameter values described above could be changed to meet a particular application or to fulfill different objectives. In addition, the invention could include an embodiment in which the actuator and first pulley are attached to a driven shaft, and the second pulley as described above could be attached to the drive shaft or engine output shaft. The invention could also be mounted in many different ways to the power equipment, including under the housing, above the housing and even on the side of a piece of power equipment.

The actuator is disclosed as including a ball/ramp device 243 for causing separation of the actuator plates. However, other known actuator devices could be incorporated in the present invention without departing from the spirit and scope of the invention. For example, a Blade Brake Clutch mechanism, as disclosed in applicant's co-pending U.S. patent application Ser. No. 09/628,447, which is hereby incorporated by reference, could be used in place of the actuator mechanism disclosed above. The actuator could also be attached to the power equipment in different manners. For example, the second (or lower) actuator plate could be fixed to the power equipment, and the first (or top) actuator plate could be connected to a control device and rotate with respect to the power equipment and second actuator plate.

Although the second pulley is disclosed as having a first sheave and second sheave that are rotationally locked with respect to each other, it is within the scope of the present invention to include first and second sheaves that can rotate with respect to each other in the second pulley. Such a configuration could provide a smoother transition when engaging the drive mechanism and/or actuator mechanism during speed change. The first sheave and second sheave of the first pulley are disclosed as being separate from each other. However, it is contemplated that these structures could contact each other or be separated by a bearing or the like. In addition, the extension portion (or hub portion) of the first sheave of the first pulley could conceivably be disconnected from the first sheave and ride freely on the drive shaft.

Furthermore, the extension portion of the first sheave could possibly be eliminated from the configuration depending on the type of belt used and the friction parameters of all moving parts.

Additionally, it is contemplated that the first pulley could be located at different positions relative to the actuator, including above or below the actuator on the drive shaft, without departing from the scope of the invention. The first sheave could also be driven with the drive shaft (instead of the second sheave being driven as disclosed above) and the second sheave could be actuated to move towards the first sheave to narrow the groove of the first pulley and move the belt into contact with the rotating first sheave. In addition, the actuator and first pulley as described above could be located on the driven shaft of the transmission drive train, and the belt could be driven by a drive pulley that is configured similar to the second pulley described in the embodiment above. The actuator could be activated to cause a first or second sheave of the driven pulley to engage with the moving belt at the driven pulley side of the transmission. In this arrangement, the belt would be moving and the driven pulley would "clutch" the moving belt to effect the variable speed transmission.

The relative sizes of the first and second pulley and belt can be varied in accordance with the desired speed ratios and in accordance with the design parameters of specific power equipment. In this same regard, the actuator size can be varied as well. The materials out of which the system is manufactured also varies widely, and includes cast metals, metal plating, plastics, rubbers, ceramic, etc. The selection of materials will effect the amount of friction necessary to engage or clutch the belt, and therefore could be a significant consideration in designing the invention for a particular application.

The control device could also be configured differently and remain within the scope of the present invention. For example, the control mechanism could be a magnetic, hydraulic, pneumatic, bellcrank or other type actuation device, and possibly could be a solenoid or other electronic actuator device.

It will be apparent to those skilled in the art that various modifications and variations can be made in the transmission of the present invention without departing from the spirit or scope of the invention. Thus, it is intended that the present invention covers the modifications and variations of this invention provided they come within the scope of the appended claims and their equivalents.

What is claimed is:

1. A variable speed transmission, comprising:
    a first pulley having a rotational axis and including a first face and a second face, the first face being movable with respect to the second face;
    a belt located adjacent the first face and the second face of the first pulley; and
    an actuator located adjacent the first pulley and adapted to move the first face to move with respect to the second face between a neutral position, an intermediate position and a full speed position,
        the neutral position defined by the first face being located at a first position with respect to the second face, and the first face being rotatable relative to the second face,
        the intermediate position defined by the first face being located at a second position that is closer to the second face than when the first face is located at the first position, the belt being in frictional engagement with the first face and second face such that motion of one of the first face, second face and belt causes another one of the first face, second face and belt to move, and
        the full speed position defined by the first face being located at a third position that is closer to the second face than when the first face is located at the second position, the belt being located in a position further from the rotational axis of the first pulley than when the first face is located at the second position.

2. The variable speed transmission of claim 1, further comprising:
    a second pulley having a second pulley rotational axis and including a primary face and a secondary face, wherein the belt is located adjacent the primary face and the secondary face.

3. The variable speed transmission of claim 2, wherein the second pulley includes a biasing mechanism located adjacent and biasing the primary face towards the secondary face of the second pulley.

4. The variable speed transmission of claim 3, wherein the biasing mechanism is a spring.

5. The variable speed transmission of claim 2, further comprising:
    a drive shaft located along the rotational axis of one of the first pulley and the second pulley, and a driven shaft located along the rotational axis of the other of the first pulley and the second pulley.

6. The variable speed transmission of claim 5, wherein the drive shaft is connected to rotate with one of the second face of the first pulley and the secondary face of the second pulley.

7. The variable speed transmission of claim 2, wherein the primary face and the secondary face are movable with respect to each other.

8. The variable speed transmission of claim 7, wherein the belt is located at a primary position with respect to the second pulley rotational axis when the first face and second face of the first pulley are located in the neutral position, and the belt is located at a secondary position, closer to the second pulley rotational axis than when the belt is located in the primary position, when the first face and second face of the first pulley are located in the full speed position.

9. The variable speed transmission of claim 7, wherein the primary face of the second pulley is located closer to the secondary face of the second pulley when the first face and second face of the first pulley are located in the neutral position as compared to when the first face and second face of the first pulley are located in the full speed position.

10. The variable speed transmission of claim 1, wherein the belt is spaced from one of the first face and second face of the first pulley when the first face and second face are located in the neutral position.

11. The variable speed transmission of claim 1, wherein the actuator is a ball/ramp actuator.

12. The variable speed transmission of claim 1, further comprising:
    a control mechanism connected to the actuator and configured to cause the actuator to move the first face of the first pulley with respect to the second face.

13. The variable speed transmission of claim 12, wherein the control mechanism includes a control line connected to the actuator, and movement of the control line causes the actuator to move the first face of the first pulley with respect to the second face such that movement of the control line between three separate positions causes the first face and second face of the first pulley to move between the neutral, intermediate and full speed positions, respectively.

14. The variable speed transmission of claim 1, further comprising:

means for causing the actuator to move the first face of the first pulley with respect to the second face.

15. The variable speed transmission of claim 1, wherein the first face of the first pulley includes a first portion extending along the rotational axis of the first pulley, and the belt is connected to the first portion of the first face when the first face is in the neutral position.

16. The variable speed transmission of claim 1, wherein the first face and second face of the first pulley angle towards each other as they approach the rotational axis of the first pulley, such that when the first face and second face move towards each other, the belt is forced by the first and second face away from the rotational axis of the first pulley.

17. A variable speed transmission for continuously varying the output speed of a drive wheel from zero to an upper speed limit, comprising:

a single control mechanism capable of controlling the speed of the drive wheel from the upper speed limit to zero;

an actuator connected to the control mechanism; and a drive train operationally connected between the control mechanism and the drive wheel, wherein the drive train includes a first and second pulley connected by a belt, the first pulley having a rotational axis, a first face and a second face, the first face being movable with respect to the second face; wherein the actuator is located adjacent the first pulley and capable of causing the first face to move with respect to the second face between a neutral position, an intermediate position and a full speed position, the neutral position defined by the first face being located at a first position with respect to the second face, and rotatable with respect to the second face, the intermediate position defined by the first face being located at a second position that is closer to the second face than when the first face is located at the first position, the belt being in frictional engagement with the first face and second face such that motion of one of the first face, second face and belt causes another one of the first face, second face and belt to move, and the full speed position defined by the first face being located at a third position that is closer to the second face than when the first face is located at the second position, the belt being located in a position further from the rotational axis of the first pulley than when the first face and second face are in the intermediate position.

18. A variable speed transmission, comprising:

a first pulley having a rotational axis and including a first face and a second face, the first face being movable with respect to the second face;

a second pulley having a second pulley rotational axis and including a primary face and a secondary face;

a belt located on the first pulley and second pulley; and an actuator located adjacent the first pulley and adapted to move the first face with respect to the second face between a neutral position and a drive position, the neutral position is defined by the first face being located at a first position with respect to the second face, and the first face being rotatable with respect to the second face, the drive position is defined by the first face and second face being frictionally engaged with the belt such that the first face, second face and belt rotate together.

19. A variable speed transmission, comprising:

a first pulley having a rotational axis and including a first face and a second face, the first face being movable with respect to the second face;

a second pulley having a second pulley rotational axis and including a primary face and a secondary face, the primary face being movable with respect to the secondary face along the second pulley rotational axis;

a biasing mechanism located adjacent one of the primary face and secondary face of the second pulley and adapted to bias the primary face towards the secondary face;

a belt located on the first pulley and second pulley; and an actuator located adjacent the first pulley and adapted to move the first face with respect to the second face between a neutral position and a drive position, the neutral position is defined by the first face being located at a first position with respect to the second face, and the first face being rotatable with respect to the second face, the drive position is defined by the first face and second face being frictionally engaged with the belt such that the first face, second face and belt rotate together.

20. The variable speed transmission of claim 19, wherein the biasing mechanism is a spring.

21. The variable speed transmission of claim 19, wherein the primary face of the second pulley includes an opening, and the secondary face includes a hub that can be inserted into the opening in the primary face.

22. The variable speed transmission of claim 21, wherein the second pulley includes an attachment plate connected to the hub of the secondary face such that movement of the primary face with respect to the secondary face is limited by the attachment plate, and the biasing mechanism is located between the primary face and the attachment plate such that the primary face is biased away from the attachment plate and towards the secondary face.

23. The variable speed transmission of claim 19, wherein the actuator is adapted to move the first face with respect to the second face between the neutral position, the drive position and a full speed position, the full speed position is defined by the first face being located at a position that is closer to the second face than when the first face is located at the second position, the belt being located in a position further from the rotational axis of the first pulley than when the first face and second face are in the drive position.

* * * * *